United States Patent [19]

Chetty et al.

[11] Patent Number: 4,625,271
[45] Date of Patent: Nov. 25, 1986

[54] SOFT-START CIRCUIT FOR A POWER CONVERTER

[75] Inventors: P. R. K. Chetty, Germantown, Md.; Gary Galloway, Marseilles; Pierre Thollot, Rockford, both of Ill.

[73] Assignee: Sundstrand Corporation, Rockford, Ill.

[21] Appl. No.: 657,834

[22] Filed: Oct. 5, 1984

[51] Int. Cl.⁴ .............................................. H02M 7/42
[52] U.S. Cl. ........................................ 363/49; 363/41; 363/98; 363/132; 323/901
[58] Field of Search ..................... 363/41, 49, 98, 131, 363/132; 323/901, 908

[56] References Cited

U.S. PATENT DOCUMENTS

| | | | |
|---|---|---|---|
| 4,180,852 | 12/1979 | Koizumi et al. | 363/49 |
| 4,195,335 | 3/1980 | Murakami et al. | 363/49 |
| 4,307,440 | 12/1981 | Inoue et al. | 363/49 |
| 4,353,114 | 10/1982 | Saleh | 363/49 |
| 4,510,422 | 4/1985 | Oqura | 363/49 |

OTHER PUBLICATIONS

*A Texas Instruments Application Report,* "Designing Switching Voltage Regulators with TL494", Spencer, John.
Publication dated Jan. 1980, pp. 39–43, distributed by Silicon General, Inc.

*Primary Examiner*—Patrick R. Salce
*Assistant Examiner*—Anita M. Ault
*Attorney, Agent, or Firm*—Wood, Dalton, Phillips Mason & Rowe

[57] ABSTRACT

A soft-start circuit for an inverter having a switch which is operated in accordance with the output of an oscillator includes a ramp generator coupled to the oscillator for generating a cycle ramp signal synchronized to and having the same period as the oscillator output, the cycle ramp signal also having an amplitude which periodically increases between first and second levels. Means are included for generating a soft-start signal having an amplitude which increases between the first and second levels, the length of time required for the amplitude of the soft-start signal to increase from the first level to the second level being substantially longer than the period of the cycle ramp signal. Means are coupled to the ramp generator and to the soft-start signal generating means for comparing the two signals to develop a pulse width modulated enable signal having a series of pulses of gradually increasing pulse width. Means are coupled to the comparing means and to the oscillator for gating the oscillator output with the pulse width modulated enable signal to derive switch control signals for the switch in the inverter. The switch is thereby operated at gradually increasing duty cycles immediately following turn on of the inverter.

10 Claims, 5 Drawing Figures

SOFT-START CIRCUIT FOR A POWER CONVERTER

DESCRIPTION

1. Technical Field

The present invention relates generally to switch controls, and more particularly to a circuit for controlling the start-up of switches in a power converter, such as an inverter.

2. Background Art

Prior converters for converting between DC power and AC power include one or more power switches which are operated to modulate the flow of power to a load. In the case of a three-phase inverter, six transistors or other switching devices are connected in a bridge configuration and are driven by control circuitry so that an AC waveform is generated between any two of the three legs of the inverter. The control circuitry includes an oscillator having a frequency equal to six times the fundamental output frequency of the inverter. The oscillator output is inputted into a three-phase logic circuit which generates three waveforms each having a frequency equal to the oscillator output frequency but which are displaced 120° from one another. The output of the three-phase logic circuit is further processed by a switch drive signal processor which develops six drive signals to drive the six transistor switches to in turn invert input DC power into AC output power.

In such an inverter, immediately following energization of the control circuitry for operating the inverter, the inverter switches are subjected to an inrush current which may be up to three times the current at steady-state operation. This is due to the fact that the drive signals are of definite width and are applied to the transistors at the beginning of circuit turn on. The possibility of such high current levels must be taken into account to insure that the inverter is not damaged by same. Specifically, the switches in the inverter must be capable of tolerating these high current levels for a relatively long period of time. Furthermore, complex current protection circuitry must be utilized which must be capable of distinguishing between steady-state and inrush currents so that steady-state overloads disable the inverter whereas inrush currents do not.

One prior attempt at limiting the effects of inrush current was to insert a delay network in the current protection circuitry so that inrush currents were disregarded and hence did not cause inverter shut down. This, however, was a crude solution to the problem and did not reduce the stress on the inverter switches caused by inrush current.

Koizumi et al U.S. Pat. No. 4,180,852 discloses a switching-type forward DC-DC converter regulator having a switching circuit which is operated to periodically interrupt unregulated DC voltage so as to derive an AC voltage therefrom. The AC voltage is rectified and filtered to produce a pure DC regulated output. The circuit includes means for performing a soft-start function including first and second current mirror circuits which control the charging of a capacitor which in turn controls the duty cycle of switching transistors in the converter.

The Koizumi et al circuitry is complex since it requires the above-noted current mirror circuits. This complexity in turn increases the cost of the circuit and, in light of the relatively large number of parts required, increases the chances of a failure in one of the components leading to the failure of the soft-start function.

DISCLOSURE OF INVENTION

In accordance with the present invention, a power converter, such as an inverter having at least one switching device for controlling the flow of power to a load, includes soft-start circuitry for gradually increasing the duration of the time that the switching device is in an on state immediately following turn on of the inverter.

The soft-start circuit of the present invention is utilizable in conjunction with an inverter having a switch which is operated in accordance with the output of an oscillator. The oscillator output is coupled to a ramp generator for generating a cycle ramp signal synchronized to and having the same period as the oscillator output with the ramp signal also having an amplitude which periodically increases between first and second levels. Means are included for generating a soft-start signal having an amplitude which increases between the first and second levels, the length of time required for the amplitude of the soft-start signal to increase from the first level to the second level being substantially longer than the period of the cycle ramp signal. Means are coupled to the ramp generator and to the soft-start signal generating means for comparing the two signals to develop a pulse width modulated control signal having a series of pulses of gradually increasing pulse width. Means are coupled to the comparing means and to the oscillator for gating the oscillator output with the pulse width modulated control signal to derive switch control signals which operate the switch at gradually increasing duty cycles. The inrush current is thereby limited to acceptable levels by the soft-start circuit.

In the preferred embodiment, the oscillator output is coupled to a pulse width modulator which develops a second pulse width modulated signal, the pulse width modulated control signal and the second pulse width modulated signal being compared to determine which has the narrower pulse width. The signal having the narrower pulse width is utilized to control the switch in the inverter.

In the preferred embodiment, the pulse width comparison is accomplished by a logical AND gate having inputs connected to the pulse width modulated control signal and to the second pulse width modulated signal.

The soft-start circuit of the present invention requires relatively few parts and hence cost and complexity are minimized as well as the possibility of failure. Furthermore, the reduction of inrush current enables the use of lower rated, and hence less expensive components.

BEST MODE FOR CARRYING OUT THE INVENTION

Figure 1:
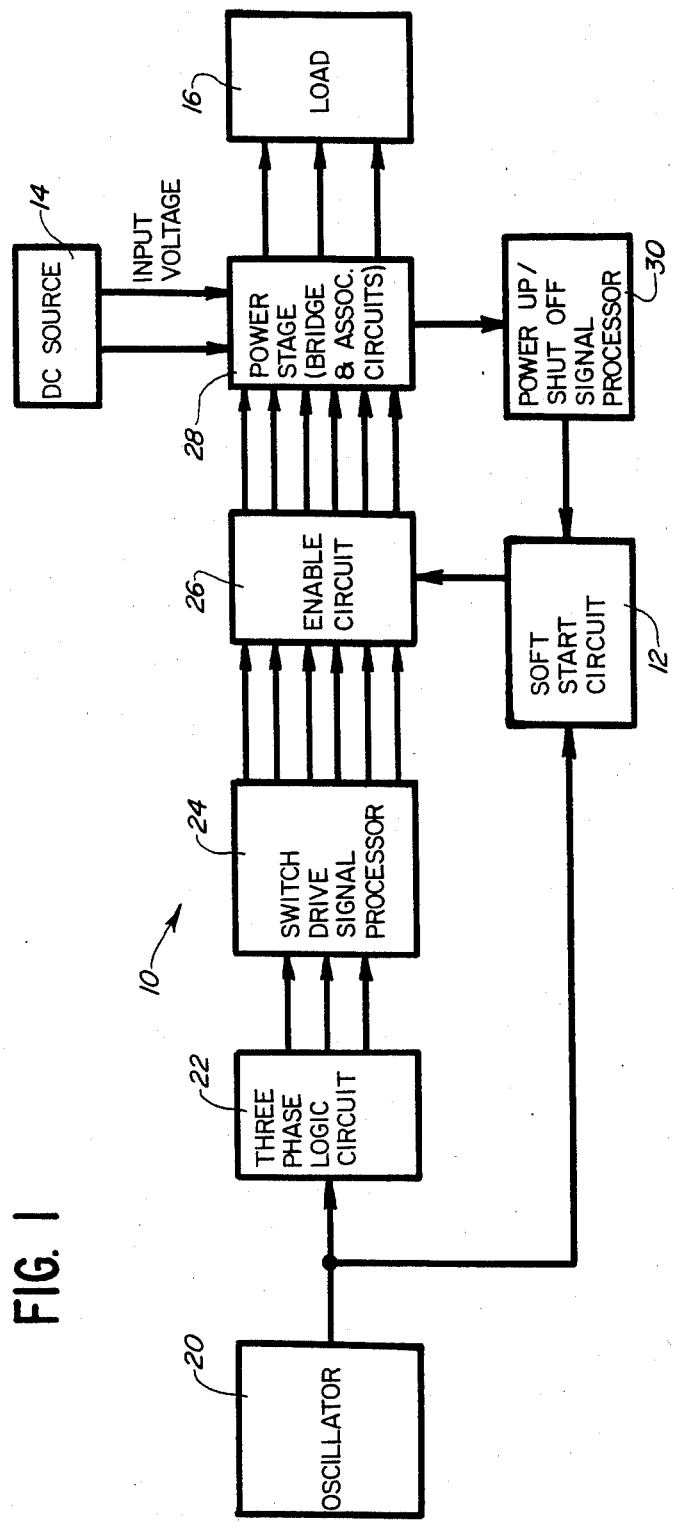
FIG. 1 is a block diagram of a power converter in conjunction with the soft-start circuit of the present invention.

Referring now to FIG. 1, there is illustrated a power converter in the form of an inverter 10 in conjunction with a soft-start circuit 12 according to the present invention. The inverter 10 converts input power from a DC source 14 into AC power for energizing a load 16.

In the illustrated embodiment, the inverter 10 is a three-phase inverter operated by control circuitry including an oscillator 20 which develops a square wave output signal having a frequency equal to six times the fundamental frequency of the inverter output. The oscillator 20 is coupled to a three-phase logic circuit 22 which develops three output signals, each having the same frequency as the output from the oscillator 20 but which are shifted 120° relative to one another.

The output from the three-phase logic circuit 22 is coupled to a switch drive signal processor 24 which develops a set of six switch drive signals from the three signals from the circuit 22. These six drive signals are coupled through an enable circuit 26 to a power stage 28.

In the embodiment shown in FIG. 1, the switch drive signal processor 24 operates in an open-loop fashion to control the inverter switches. The processor 24 may be replaced, if desired, by a pulse width modulator which varies the pulse width of the drive signals for the inverter switches in accordance with output parameters of the inverter so that a closed-loop system is obtained.

Figure 1A:
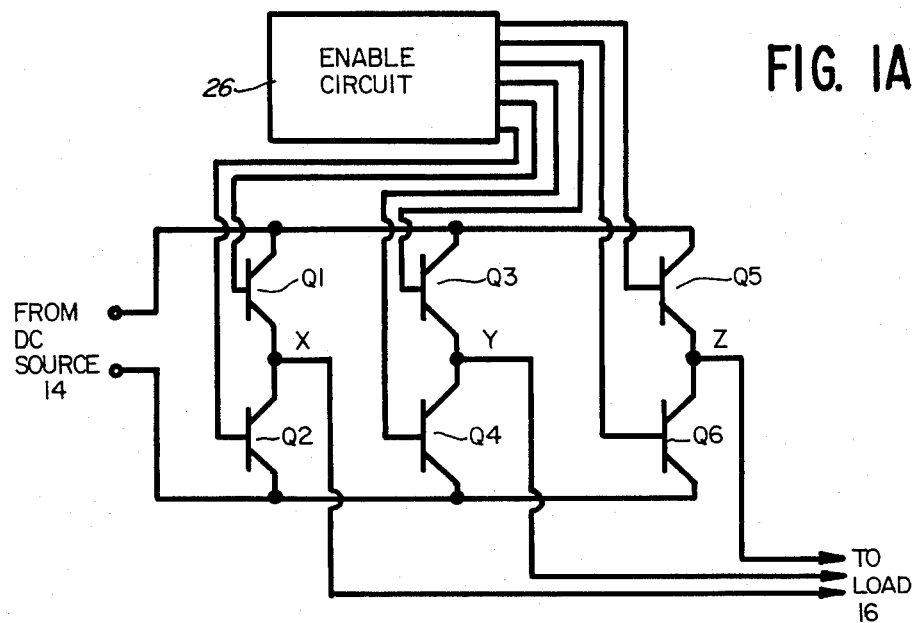
FIG. 1a is a simplified schematic diagram of the bridge contained within the power stage shown in block diagram form in FIG. 1.

As shown in FIG. 1a, the power stage 28 includes a plurality of switching elements, such as transistors Q1–Q6 which are connected in a typical three-phase bridge configuration. The transistors Q1–Q6 are operated by the enable circuit 26 in a fashion so that an alternating circuit square wave is generated between the junctions X,Y,Z connecting pairs of the transistors. It should be noted that the usual free-wheeling diodes, filter elements and base drive circuits normally associated with the bridge are not shown in FIG. 1a for purposes of simplicity.

The power output from the power stage 28 may be delivered to the load 16 directly or through a three-phase transformer (not shown) which provides isolation and voltage translation and minimizes third harmonics and its multiples.

The load current is sensed by a powerup/shutoff signal processor 30 which in turn provides an enable signal to the soft-start circuit 12. The circuit 12 also receives the output signal from the oscillator 20. The signal from the oscillator 20 is utilized to synchronize the soft-start circuit, and hence the operation of the inverter switches, as noted more specifically below.

Generally, the soft-start circuit operates in conjunction with the enable circuit 26 to gradually increase the duty cycle of the switches in the power stage 28 immediately following energization of the inverter 10 to limit inrush current to lower and/or acceptable levels. The soft-start circuit develops a pulse width modulated enable signal which is utilized by means in the enable circuit 26 for a period of time following energization to modulate the outputs from the switch drive signal processor 24.

Figure 2:
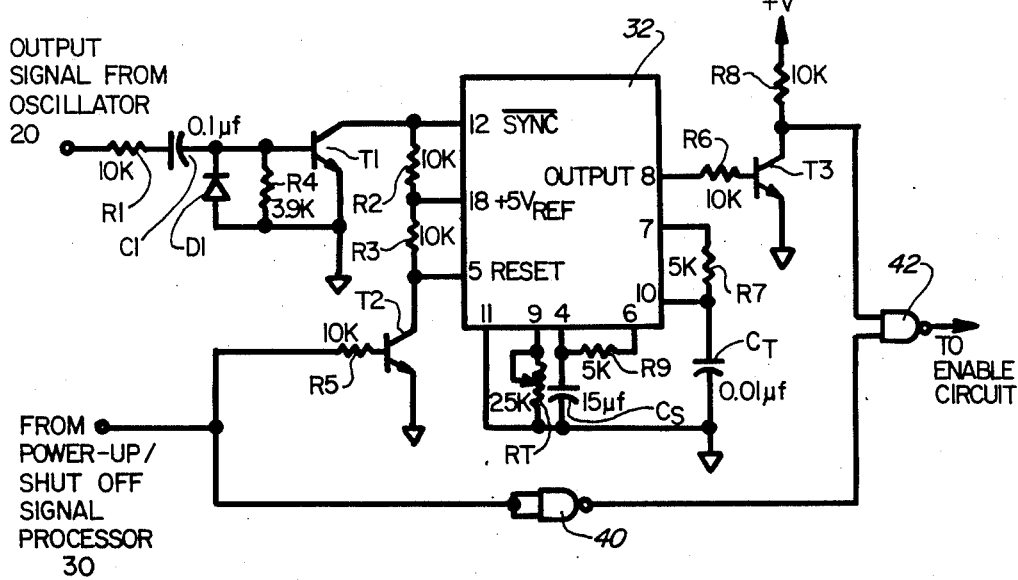
FIG. 2 is a schematic diagram of the soft-start circuit shown in block diagram form in FIG. 1.

Referring now to FIG. 2, the soft-start circuit is implemented in part by a regulating pulse width modulator integrated circuit 32 manufactured by Silicon General, Inc. of Garden Grove, Calif. under part number SG1526. The integrated circuit 32 receives synchronizing pulses from the oscillator 20 through a resistor R1, a capacitor C1 and a transistor T1 to an input at a pin 12. The pin 12 and transistor T1 are also coupled through a resistor R2 to a pin 18 of the integrated circuit 32 at which is provided a 5 volt reference. The synchronization of the integrated circuit 32 to the oscillator signal insures that the phase of pulse width modulated enable signal is in phase with the switch drive signals.

A pin 5 is coupled by a resistor R3 to the pin 18 and also receives a signal from the powerup/shutoff signal processor 30 through a resistor R5 and a transistor T2. This signal resets the integrated circuit 32 and causes it to start developing the pulse width modulated enable signal to in turn energize the inverter 10. The reset signal from the signal processor 30 is also coupled through an inverter in the form of a NAND gate 40 to a second NAND gate 42. The other input of the NAND gate 42 is coupled to the collector of a transistor T3 which receives at its base electrode an output signal from a pin 8 of the integrated circuit 32 through a resistor R6.

A pin 7 of the integrated circuit 32 is coupled through a resistor R7 and a capacitor $C_T$ to ground potential. The junction between the resistor R7 and the capacitor $C_T$ is connected to a pin 10 of the integrated circuit 32.

A potentiometer $R_T$ is coupled between a pin 9 of the integrated circuit 32 and ground. The resistor $R_T$ and the capacitor $C_T$ together determine the slope of a ramp signal generated within the integrated circuit 32, as noted more specifically in connection with FIG. 3.

A capacitor $C_S$ is connected between ground and a pin 4 of the integrated circuit 32. The pin 4 is also connected to a pin 6 through a resistor R9 while a pin 11 is connected to ground.

Figure 3:
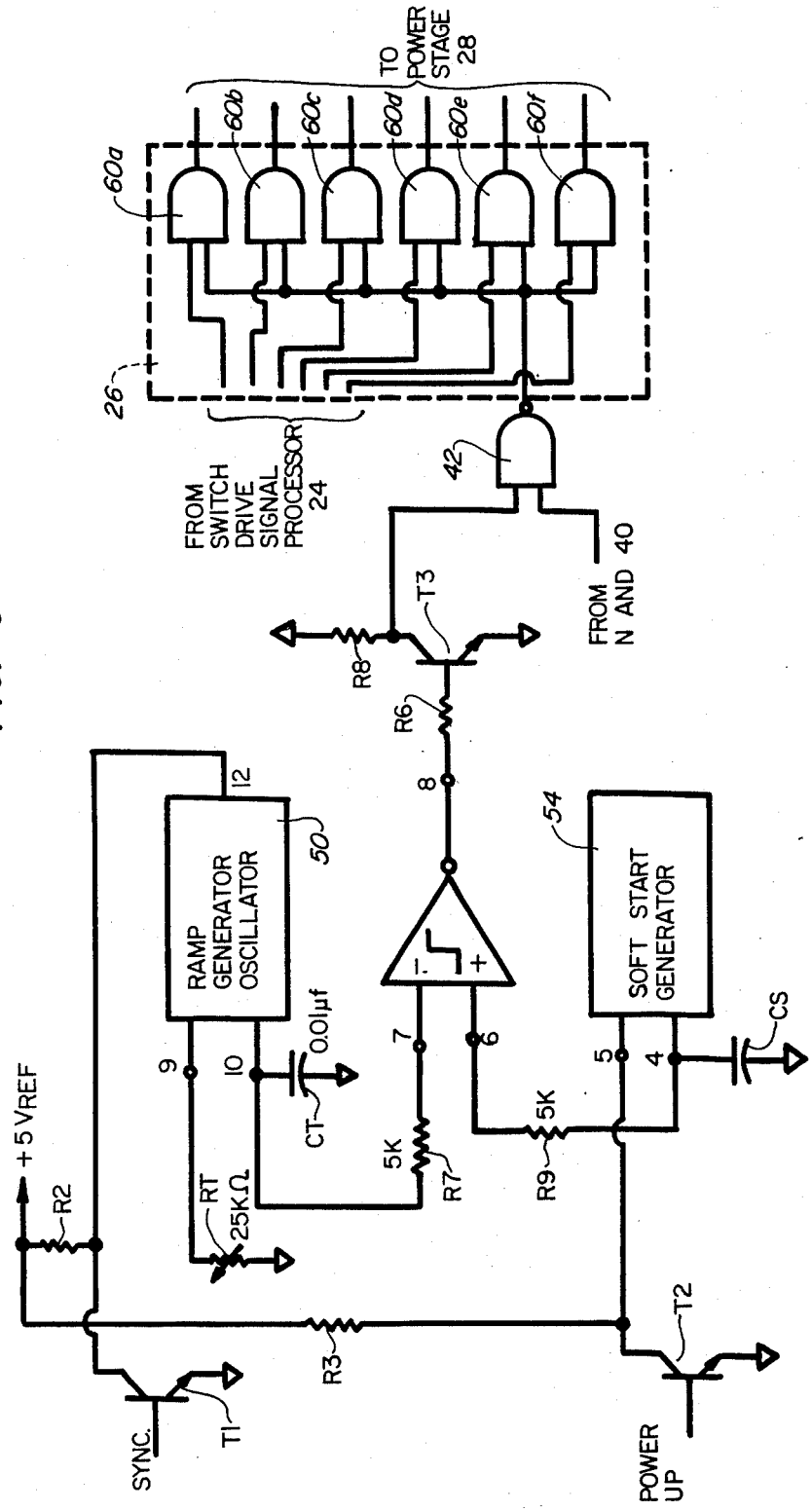
FIG. 3 is an equivalent diagram of the circuit shown in FIG. 2.
Figure 4:
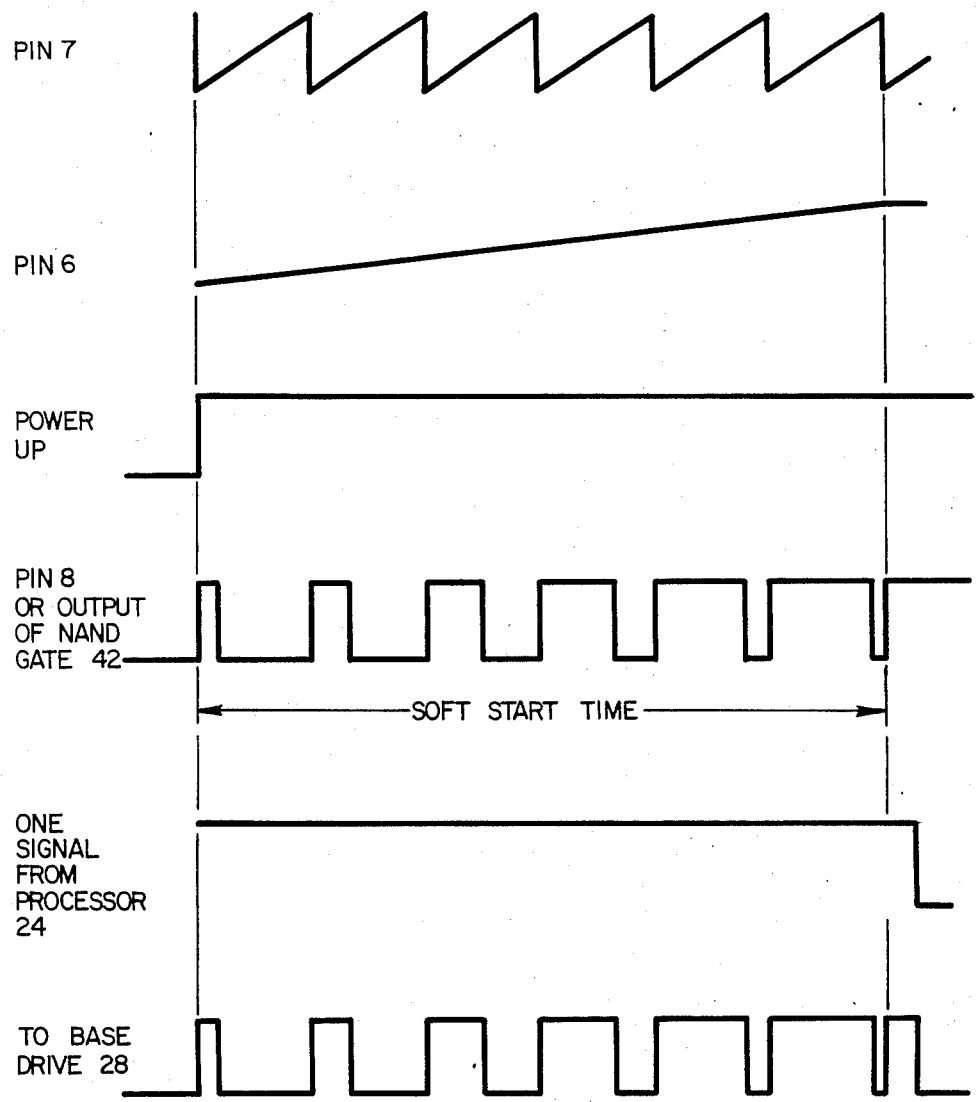
FIG. 4 is a set of waveform diagrams illustrating the operation of the circuit shown in FIG. 2.

Referring now to FIGS. 3 and 4, the operation of the soft-start circuit of the present invention shown in FIG. 2 will be described in conjunction with the equivalent diagram and the waveforms illustrated therein.

The integrated circuit 32 includes an internal ramp generator or oscillator 50 which develops a cycle ramp signal at the pin 10. The cycle ramp signal amplitude periodically increases between first and second levels and is reset by each negative-going transition of the square wave output from the oscillator 20. The cycle ramp signal is therefore synchronized to and has the same frequency as the output of the oscillator 20. The slope of the cycle ramp signal, and hence the magnitude of the second level, is determined by the values for the resistor $R_T$ and capacitor $C_T$ previously described.

It should be noted that the integrated circuit 32 itself includes a clock oscillator, the output of which can be used to control the three-phase logic circuit 22. In such a case, the oscillator 20 need not be used as an input to the logic circuit 22, and synchronization is achieved by connecting the output of the clock oscillator in the integrated circuit 32 to the input of the circuit 22 and by adjusting the frequency of the clock oscillator so that it is equal to the frequency of the oscillator 20.

The output from the oscillator 50 is coupled through the resistor R7 to pin 7 comprising one input of a comparator 52. A second input to the comparator 52 at the pin 6 is derived from the output of a soft-start generator 54. The generator 54 charges the capacitor $C_S$ and generates a soft-start signal having an amplitude which increases between third and fourth levels with the length of time required for the amplitude of the soft-start signal to increase between these levels, as determined by the value of the capacitor $C_S$, being substantially longer than the period of the ramp signal from the oscillator 50.

In the preferred embodiment, and as described more specifically hereinafter, the third level is slightly greater than the first level while the fourth level is slightly less than the second level. Also, the soft-start signal is a linearly increasing signal caused by charging of the capacitor $C_S$ by the generator 54 which is a constant current source.

The soft-start generator 54 is reset by a step signal from the transistor T2, which in turn develops the step signal in response to a signal from the powerup/shutoff signal processor 30 to energize the inverter 10.

The comparator 52 develops a pulse width modulated output signal based upon the comparison of the cycle ramp signal from the oscillator 50 with the soft-start signal from the soft-start generator 54. As seen in the waveform diagrams of FIG. 4, the pulse width initially starts at a minimum value and slowly increases to a maximum value.

It should be noted that the pulse widths can be limited between whatever maximum or minimum values are desired, the limits being a function of the difference between the first and third levels and the second and fourth levels. By limiting the pulse width duty ratio to a predetermined maximum value, for example 90%-95%, the possibility of both switches of a leg of the inverter being simultaneously on is eliminated, thereby preventing cross conduction or shoot-through. This feature eliminates the need for polarized delay networks commonly incorporated in previous inverters.

The length of time over which a soft-start operation occurs (hereinafter designated the soft-start time) is a function of the slope of the output signal from the soft-start generator 54. It should be noted in this regard that the output from the soft-start generator 54 need not be a linearly increasing level but may be a different type of increasing level, if desired.

As seen specifically in FIG. 3, the output from the comparator 52 is inverted by the transistor T3 and is coupled to one input of the NAND gate 42. The other input of the NAND gate 42 is coupled to the output of the NAND gate 40 which is connected as an inverter to invert powerup/shut off signal. The output of the NAND gate 42 is coupled to a series of AND gates 60a–60f in the enable circuit 26. The remaining input of each of the AND gates 60a–60f is coupled to a signal from the switch drive signal processor 24. The signals from the switch drive signal processor 24, one of which is illustrated in Fig. 4, are in phase with the signal for the comparator 52. During the soft-start time, each signal from the switch drive signal processor 24 is gated by the pulse width modulated signal from the comparator 52 in the AND gates 60 and the resultant signals are coupled to the switches in the power stage 28. In effect, the AND gates 60a–60f compare the pulse widths of the pulse width modulated signal from the comparator 52 with the pulse widths of the signals from the switch drive signal processor 24 and couple the signal having the narrower pulse width to the switches in the power stage 28.

The switches in the power stage 28 are therefore controlled immediately following turn on of the inverter 10 such that the duty cycles thereof increase from a low value up to the commanded value within the soft-start time period. This operation limits the inrush current to lower and/or acceptable levels, e.g. 150% of the steady-state magnitude as compared with 300% or more of the steady-state magnitude without the soft-start circuit. The circuit also reduces the demands placed on the power switches in the power stage 28 as well as simplifying the circuitry for current protection. Furthermore, the instant circuit enables the selection of a relatively small device to solve the inrush current problem at a cost less than the use of discrete components.

It should be noted that the soft-start circuit of the present invention is not limited to use with three-phase inverters or even to use with pulse-width modulated inverters. The circuit is effective to limit inrush currents in any type of power converter having at least one switch operated by an oscillator to control the flow of power to a load. In such a case, the circuits 22 and 24 would not necessarily be present, and a single AND gate would receive the oscillator output and the pulse width modulated control signal from the soft-start circuit and would control the switch at increasing duty cycles.

We claim:

1. In a power converter having a switch which is operated in accordance with the output of an oscillator to control the flow of power to a load, a softstart circuit for limiting inrush current following turn on of the converter, comprising:

a ramp generator coupled to the oscillator for generating a cycle ramp signal synchronized to and having the same period as the oscillator output, the cycle ramp signal also having an amplitude which periodically increases from a first to a second level;

means for generating a soft-start signal having an amplitude which increases between the first and second levels, the length of time required for the amplitude of the soft-start signal to increase between the levels being substantially longer than the period of the cycle ramp signal;

first means for comparing the cycle ramp signal to the soft-start signal to develop a pulse width modulated enable signal having a series of pulses of gradually increasing pulse width;

a signal processor having an input coupled to the oscillator output and further having an output; and means coupled to the comparing means and to the oscillator for gating the oscillator output with the pulse width modulated enable signal to derive switch control signals which operate the switch at gradually increasing duty cycles during the time the soft-start signal increases including second means for comparing the pulse widths of the pulse width modulated enable signal and the output of the signal processor so that the switch is operated in accordance with the signal having the narrower pulse width.

2. The soft-start circuit of claim 1, wherein the second comparing means comprises an AND gate having inputs connected to the pulse width modulated enable signal and to the output of the signal processor.

3. The soft-start circuit of claim 1, wherein the soft-start signal generating means includes a capacitor and means for charging the capacitor to develop the soft-start signal.

4. The soft-start circuit of claim 3, wherein the charging means includes means for linearly charging the capacitor from a third level to a fourth level wherein the third level is greater than the first level and the fourth level is less than the second level.

5. In a power converter having a switch which is operated in accordance with the output of an oscillator to control the flow of power to a load, a soft-start circuit for limiting inrush current following turn on of the converter, comprising:
  a ramp generator coupled to the oscillator for generating a cycle ramp signal synchronized to and having the same period as the oscillator output, the cycle ramp signal also having an amplitude which periodically increases from a first to a second level;
  means for generating a soft-start signal having an amplitude which increases between the first and second levels, the length of time required for the amplitude of the soft-start signal to increase between the levels being substantially longer than the period of the cycle ramp signal;
  means for comparing the cycle ramp signal to the soft-start signal to develop a pulse width modulated enable signal having a series of pulses of gradually increasing pulse width; and
  means coupled to the comparing means and to the oscillator for gating the oscillator output with the pulse width modulated enable signal to derive switch control signals which operate the switch at gradually increasing duty cycles during the time the soft-start signal increases including an AND gate having first and second inputs coupled to the pulse width modulated enable signal and the oscillator output and an output coupled to the switch.

6. In a polyphase inverter which is energizable to convert DC power into polyphase AC power for energizing a load having an oscillator, a power stage including a plurality of power switches and means coupled to the oscillator for developing a plurality of switch drive signals which are coupled to the power switches such that they in turn develop the AC power, a soft-start circuit for limiting inrush current following turn on of the inverter, comprising:
  a ramp generator coupled to the oscillator for generating a cycle ramp signal which is synchronized to and has the same period as the oscillator output;
  means for generating a soft-start signal which increases between certain levels when the inverter is turned on, the time required for the soft-start signal to increase between the certain levels being substantially longer than the period of the cycle ramp signal;
  means coupled to the ramp generator and the soft-start signal generating means for comparing the cycle ramp signal with the soft-start signal to derive a pulse width modulated control signal having a series of pulses of gradually increasing pulse widths; and
  means for gating each of the plurality of switch drive signals with the pulse width modulated enable signal so that the switches are operated at gradually increasing duty cycles including a plurality of AND gates each having a first input coupled to a switch drive signal, a second input coupled to the pulse width modulated enable signal and an output coupled to a power switch.

7. The soft-start circuit of claim 6, wherein the soft-start signal generating means includes a capacitor and means for linearly charging the capacitor to generate the soft-start signal.

8. The soft-start circuit of claim 7, wherein the ramp generator is periodically reset by the oscillator and includes means for adjusting the slope of the cycle ramp signal so that the amplitude thereof rises from a first to a second level, the soft-start signal generating means including means for causing the soft-start signal to linearly increase between the first and second levels.

9. In a polyphase inverter which is energizable to convert DC power into polyphase AC power for energizing a load having an oscillator, a power stage including a plurality of power switches and means coupled to the oscillator for developing a plurality of switch drive signals which are coupled to the power switches such that they in turn develop the AC power, a soft-start circuit for limiting inrush current following turn on of the inverter, comprising:
  a ramp generator coupled to the oscillator for generating a cycle ramp signal which is synchronized to and has the same period as the oscillator output;
  means for generating a soft-start signal which increases between certain levels when the inverter is turned on, the time required for the soft-start signal to increase between the certain levels being substantially longer than the period of the cycle ramp signal;
  means coupled to the ramp generator and the softstart signal generating means for comparing the cycle ramp signal with the soft-start signal to derive a pulse width modulated control signal having a series of pulses of gradually increasing pulse widths; and
  means for gating each of the plurality of switch drive signals with the pulse width modulated enable signal so that the switches are operated at gradually increasing duty cycles including means coupled to the pulse width modulated enable and switch drive signals for operating each power switch in accordance with the signal having the narrower pulse width.

10. In a polyphase inverter which is energizable to convert DC power into polyphase AC power for energizing a load having an oscillator, a power stage including a plurality of power switches and means coupled to the oscillator for operating the power switches in accordance with a plurality of switch drive signals to develop the AC power, a soft-start circuit for limiting inrush current following powerup of the inverter, comprising:
  a ramp generator coupled to the oscillator for generating a cycle ramp signal which periodically increases from a first to a second level, the cycle ramp signal being synchronized to and having the same period as the oscaillator output;
  means for generating a soft-start signal which linearly increases from a third to a fourth level, the third and fourth levels being between the first and second levels, the time required for the soft-start signal to increase from the third to the fourth level being substantially longer than the period of the cycle ramp signal;
  a comparator having first and second inputs which receive the cycle ramp signal and the soft-start signal, respectively, and an output which develops a pulse width modulated enable signal; and
  a plurality of AND gates in the operating means each having first and second inputs which receive a switch drive signal and the pulse width modulated enable signal, respectively, and an output coupled to a power switch for modulating each switch control signal with the pulse width modulated enable signal.

* * * * *